(12) United States Patent
Wollum et al.

(10) Patent No.: US 6,492,439 B2
(45) Date of Patent: Dec. 10, 2002

(54) ASPHALT COMPOSITIONS

(75) Inventors: Mark H. Wollum, Wilmington, NC (US); Daniel F. Graves, Canal Fulton, OH (US)

(73) Assignee: Firestone Polymers, LLC, Akron, OH (US)

( * ) Notice: Subject to any disclaimer, the term of this patent is extended or adjusted under 35 U.S.C. 154(b) by 0 days.

(21) Appl. No.: 09/750,570

(22) Filed: Dec. 28, 2000

(65) Prior Publication Data

US 2002/0128355 A1 Sep. 12, 2002

(51) Int. Cl.⁷ .................................................. C08L 95/00
(52) U.S. Cl. .............................. 524/68; 524/59; 524/71
(58) Field of Search ............................... 564/59, 68, 71

(56) References Cited

U.S. PATENT DOCUMENTS

| 5,187,236 A | * | 2/1993 | Coolbaugh et al. | 525/314 |
| 5,256,710 A | | 10/1993 | Krivohlavek | 524/68 |
| 6,306,967 B1 | * | 10/2001 | Matsuda et al. | 525/314 |

* cited by examiner

*Primary Examiner*—Peter Szekely
(74) *Attorney, Agent, or Firm*—Meredith Palmer; Scott McCollister

(57) ABSTRACT

A rubber-modified asphalt composition is provided. The asphalt composition includes asphalt, a rubber including at least high vinyl poly(conjugated diene), and at least one phenolic curing resin. The high vinyl poly(conjugated diene) has a vinyl content of at least 35%. The use of phenolic curing agents results in improvements to the softening point of the present asphalt composition while also improving toughness and tenacity.

20 Claims, No Drawings

ASPHALT COMPOSITIONS

FIELD OF THE INVENTION

This invention relates to asphalt compositions. More specifically, this invention relates to rubber-modified asphalt compositions with improved softening points.

BACKGROUND OF THE INVENTION

Asphalt has become an important material for building and repairing roads. It is also used in applications such as roofing and weather sealing. The estimated annual use of asphalt in the United States alone is more than 13 million kilograms.

The addition of rubber to asphalt can improve properties such as crack resistance, softening points, viscosity, tensile strength, elongation, toughness, and tenacity. It has also been shown that curing agents can be used to further improve asphalt properties. Sulfur is a commonly used curing agent for rubber-modified asphalt compositions. However, large amounts of sulfur are needed to fully cure the compositions and sulfur demonstrates a tendency to form gels.

Phenolic resins recently have been used as curing agents for rubber-modified asphalt compositions. Phenolic resins are inexpensive and easily made and have been employed in a variety of applications including coatings, dispersions, adhesives, molding compounds, and laminates.

It would be desirable to develop a better phenolic-cured rubber system for use in asphalt compositions to improve the softening point of the asphalt as well as the toughness and tenacity.

SUMMARY OF THE INVENTION

A rubber-modified asphalt composition is provided. The asphalt composition includes asphalt, a rubber including at least high vinyl poly(conjugated diene), and at least one phenolic curing resin. The high vinyl poly(conjugated diene) has a vinyl content of at least 35%. In another embodiment, a method for forming the aforementioned asphalt composition is provided.

Asphalt compositions containing high vinyl rubbers cured with phenolic curing resins exhibit desirable properties. The use of phenolic curing agents results in improvements to the softening point of the present asphalt composition while also improving toughness and tenacity. As known to the skilled artisan, tenacity levels represent the strength and durability of the asphalt compositions. Specifically, tenacity is a measurement of the resilience of an asphalt composition at room temperature. The softening point of the present asphalt compositions is preferably between about 40 and 100° C., more preferably between about 60 and 80° C. The tenacity of the present compositions is preferably between about 35 and 150 cm-kg, more preferably greater than about 40 cm-kg. The toughness of the present compositions is preferably greater than about 90 cm-kg, more preferably greater than about 100 cm-kg.

DETAILED DESCRIPTION OF ILLUSTRATIVE EMBODIMENTS

The asphalt composition includes asphalt, a rubber including at least high vinyl poly(conjugated diene), and at least one phenolic curing resin. The high vinyl poly (conjugated diene) has a vinyl content of at least 35%.

Asphalts, as used herein, include cementitious materials in which the predominating constituents are bitumens that occur in nature or are obtained in petroleum processing. Bitumen is a term which encompasses cementitious substances, natural or manufactured, composed principally of high molecular weight hydrocarbons, of which asphalts, tars, pitches, and asphalitites are typical. Asphalts are often classified as solids, semisolids, or liquids. They are often defined as the manufactured materials that are produced during petroleum processing. Asphalts characteristically contain very high molecular weight molecular polar species, called asphaltenes, which are soluble in carbon disulfide, pyridine, aromatic hydrocarbons, chlorinated hydrocarbons, and tetrahydrofuran (THF). Asphalts produced from the refining of petroleum have been used primarily in paving and roofing applications.

A preferred rubber is at least a poly(conjugated diene). Exemplary conjugated diene contributed monomer units include 1,3-butadiene, isoprene, 2,3-dimethyl-1,3-butadiene, and 1,3-pentadiene. Preferred conjugated diene contributed monomer units are 1,3-butadiene and isoprene. The rubber may include more than one conjugated diene contributed monomer unit, such as, for example, the rubber may be a poly(1,3-butadiene-co-isoprene).

In addition, the rubber may also contain additional monomer contributed units. Exemplary monomer contributed units include vinyl-substituted aromatic hydrocarbons. Suitable vinyl-substituted aromatic hydrocarbons include styrene, α-methylstyrene, 1-vinylnaphthalene, 2-vinylnaphthalene, 1-α-methyl vinylnaphthalene, 2-α-methyl vinylnaphthalene, as well as alkyl, cycloalkyl, aryl, alkaryl, and aralkyl derivatives thereof, and di-or tri-vinyl aromatic hydrocarbons. A preferred vinyl-substituted aromatic hydrocarbon is styrene. The rubber is preferably any of poly(1,3-butadiene), styrene-butadiene diblock polymers, as well as any styrene-butadiene block or random polymers, and mixtures thereof.

The rubber compositions can be vinyl-modified to create high vinyl conjugated diene monomer units. A 1,2-microstructure controlling agent or randomizing modifier may be used to control the vinyl content in the conjugated diene contributed monomer units. To achieve the high vinyl structure, the microstructure can be adjusted through the use of standard 1,2-microstructure controlling agents such as ethers, tertiary amines, chelating ethers or amines, and sodium or potassium alkoxides or alkyls to increase the 1,2-addition reaction of the conjugated diene monomers. Moreover, as used herein, the vinyl content of the conjugated diene means the percentage of conjugated diene monomer units which have undergone 1,2-addition reactions in the polymerization resulting in pendant vinyl groups along the backbone of the polymer chain.

Suitable modifying agents are known in the art and are chosen from hexamethylphosphoric acid triamide, N,N,N', N'-tetramethylethylene diamine, ethylene glyclol dimethyl ethyer, diethylene glycol dimethyl ether, triethylene gylcol dimethyl ether, tetraethylene glycol dimethyl ether, THF, 1,4-diazabicyclo [2.2.2] octane, diethyl ethyer, triethylamine, tri-n-butylphosphine, p-dioxane, 1,2-dimethyoxy ethane, dimethyl ether, methyl ethyl ether, ethyl propyl ether, di-n-propyl ether, di-n-octyl ether, anisole, dibenzyl ether, diphenyl ether, dimethylethylamine, bis-oxalanyl propane, tri-n-propyl amine, trimethyl amine, tri-ethyl amine, N,N-dimethyl aniline, N-ethylpiperidine, N-methyl-N-ethyl aniline, N-methylmorpholine, tetramethylenediamine, oligomeric oxolanyl propanes, 2,2-bis-(4-methyl dioxane), bistetrahydrofuryl propane, and mixtures thereof These modifying agents may be employed in amounts generally ranging from about 1:100 to 100:1 molar ratio of modifier to anionic initiator.

The 1,2-addition product can be increased from about the 5–15% range, common in non-modified polymers, to as high as about 90% of the conjugated diene monomer units being incorporated into the conjugated diene segments of the rubber. The rubber preferably has a vinyl content greater than 35%, more preferably between about 40 and 90%, most preferably between about 50 and 90%.

The rubber compositions may also be further functionalized to contain different organic functional groups useful in the formation of the asphalt compositions. Suitable functional groups include carboxy, hydroxy, formyl, amino, halo, and alkyl.

The rubber composition is cured with at least one phenolic curing resin. Phenolic resins are the reaction product of phenols, or substituted phenols, and aldehydes in the presence of an acidic or basic catalyst. Suitable phenols are one or more of phenol, m-cresol, p-cresol, o-cresol, p-t-butylphenol, p-octylphenol, p-nonylphenol, p-phenylphenol, bisphenol A, resorcinol, cashew nutshell liquid, and mixtures thereof. Suitable aldehydes for phenolic resin formation include formaldehyde, gaseous formalin, paraformaldehyde, trioxane, hexamethylenetetramine, acetaldehyde, paraldehyde, glyoxal, fural, and mixtures thereof. These phenols and aldehydes may be used interchangeably, with the primary requirement being the use of any one phenol and any one aldehyde to produce the desired phenolic resin.

The formation of phenolic resins may be catalyzed by acidic, neutral, or basic catalysts. Exemplary strong-acid catalysts include hydrochloric acid, sulfuric acid, sulfonic acid, oxalic acid, and phosphoric acid. Suitable neutral catalysts include divalent metal catalysts containing Zn, Mg, Mn, Cd, Co, Pb, Cu, Ni, and mixtures thereof Aluminum salts are also effective catalysts. Neutral catalysts are used in conjunction with anions, preferably with organic carboxylates. Basic catalysts suitable for the formation of phenolic resins include NaOH, $Ca(OH)_2$, $Ba(OH)_2$, and mixtures thereof. Suitable phenolic resins for use in the present invention include halomethylated alkyl phenolic resins, methylol phenolformaldehyde resins, and related species.

When asphalt polymer blends are prepared for use, given portions of polymer are blended into the molten asphalt at a specified temperature in conjunction with, or prior to, the addition of a curing agent. The final asphalt composition preferably contains between about 85–99.9 wt % asphalt, between about 1–15 wt % rubber, and between about 0.05–5 wt % phenolic resin. More preferably, the final asphalt composition contains between about 90–99.9 wt % asphalt, between about 5–15 wt % rubber, and between about 0.05–2 wt % phenolic resin.

According to an exemplary embodiment, the rubber compositions are dissolved in molten asphalt at temperatures greater than about 120° C. After the rubber has fully dissolved, at least one phenolic resin is added to the composition. Alternatively, the curing agent(s) may be added to the molten asphalt simultaneously with the rubber compositions. The asphalt composition thus formed is a homogeneous mixture after mixing. The mixing temperature is preferably between about 145 and 205° C., most preferably between about 160 and 180° C. The mixing times are usually between about 30 and 450 minutes, preferably between about 45 and 210 minutes.

In the following, the present invention will be described in more detail with reference to non-limitative examples. The following examples and table are presented for purposes of illustration only and are not to be construed in a limiting sense.

EXAMPLES

An AC-20 asphalt (Citgo, Inc.) was brought to approximately 175° C. through the use of a feedback type heating mantel. The asphalt is agitated with a cowles type mixing head, and rubber polymer mix was added and agitated for four hours. The curing agent was then added to the composition and agitation was continued for an additional 3 hours. The samples were mixed until visually homogenous.

Physical details of the various mixtures as well as test results are shown in Table 1. The asphalt compositions were tested for softening point, toughness, and tenacity. The toughness and tenacity measurements were obtained by the ASTM D5801 standard. Table 1 shows the improvement in the softening point of asphalt compositions modified with a high-vinyl rubber and a phenolic resin curing agent. In Table 1, BLC-720-C and CR 7530 represent phenolic curing resins obtained from TexPar Energy and Sovereign Chemical, respectively. Stereon™ 860 (57% vinyl) is a vinyl modified poly(1,3-butadiene-co-styrene) manufactured by Firestone Polymers. Stereon™ 840 (8% vinyl), Stereon™ 210 (8% vinyl) polymers, manufactured by Firestone Polymers, and Kraton™ 1101 (8% vinyl) polymers, manufactured by Kraton Polymers, are non-vinyl modified poly(1,3-butadiene-co-styrene) polymers.

Although the invention has been described with reference to exemplary embodiments, various changes and modifications can be made without departing from the scope and spirit of the invention. These modifications are intended to fall within the scope of the invention as defined by the claims

TABLE 1

| Formulation | A | B | C | D | E | F | G | H | I | J | K | L | M | N |
|---|---|---|---|---|---|---|---|---|---|---|---|---|---|---|
| Asphalt (wt %) | 96 | 95.8 | 95.8 | 95.7 | 96 | 95.8 | 95.8 | 95.7 | 96 | 95.8 | 95.8 | 95.7 | 95.8 | 95.7 |
| BLC-720-C (wt %) |  | 0.2 |  |  |  | 0.2 |  |  |  | 0.2 |  |  |  |  |
| CR7350 (wt %) |  |  | 0.2 | 0.3 |  |  | 0.2 | 0.3 |  |  | 0.2 | 0.3 | 0.2 | 0.3 |
| Stereon ™ 860 (wt %) | 4 | 4 | 4 | 4 |  |  |  |  |  |  |  |  |  |  |
| Stereon ™ 840 (wt %) |  |  |  |  | 4 | 4 | 4 | 4 |  |  |  |  |  |  |
| Kraton ™ 1101 (wt %) |  |  |  |  |  |  |  |  | 4 | 4 | 4 | 4 |  |  |
| Stereon ™ 210 (wt %) |  |  |  |  |  |  |  |  |  |  |  |  | 4 | 4 |
| Mix time, smooth, min | 120 | 120 | 120 | 120 | 45 | 45 | 45 | 45 | 210 | 210 | 210 | 210 | 60 | 60 |
| Mix time, complete, min | 420 | 420 | 420 | 420 | 420 | 420 | 420 | 420 | 420 | 420 | 420 | 420 | 420 | 420 |
| Softening point, ° C. | 65 | 73 | 60 | 63 | 58 | 59 | 57 | 58 | 66 | 65 | 65 | 69 | 57 | 59 |

TABLE 1-continued

| Formulation | A | B | C | D | E | F | G | H | I | J | K | L | M | N |
|---|---|---|---|---|---|---|---|---|---|---|---|---|---|---|
| Toughness, cm-kg | 74.98 | 114.9 | 188.1 | 193.0 | 200.3 | 180.4 | 163.4 | 171.5 | 219.1 | 144.8 | 270.5 | 301.5 | 57.5 | 73.37 |
| Tenacity, cm-kg | 7.03 | 48.07 | 103.8 | 95.00 | 112.6 | 102.9 | 85.00 | 98.9 | 137.4 | 71.88 | 178.7 | 206.7 | 5.865 | 15.53 |

We claim:

1. An asphalt composition compring:
   a. asphalt,
   b. a rubber comprising at least high vinyl poly(conjugated diene) having a vinyl content greater than about 35%, and
   c. at least one phenolic resin.

2. The composition of claim 1 wherein said poly(conjugated diene) comprises monomer units chosen from the group consisting of 1,3-butadiene, isoprene, 2,3-dimethyl-1,3-butadiene, 1,3-pentadiene, and mixtures thereof.

3. The composition of claim 1 wherein said poly(conjugated diene) is poly(1,3-butadiene).

4. The composition of claim 1 wherein said rubber further comprises vinyl-substituted aromatic hydrocarbon contributed monomer units.

5. The composition of claim 4 wherein said vinyl-substituted aromatic hydrocarbon contributed monomer units are chosen from the group consisting of styrene, α-methylstyrene, 1-vinylnaphthalene, 2-vinylnaphthalene, 1-α-methyl vinylnaphthalene, as well as alkyl, cycloalkyl, aryl, alkaryl, and aralkyl derivatives thereof, and di-or tri-vinyl substituted aromatic hydrocarbons, and mixtures thereof.

6. The composition of claim 4 wherein said vinyl-substituted aromatic hydrocarbon is styrene.

7. The composition of claim 4 wherein the vinyl content of said rubber is between about 40 and 90%.

8. The composition of claim 1 wherein said phenolic resin comprises the reaction product of a phenol and an aldehyde.

9. The composition of claim 1 wherein said phenolic resin is selected from the group consisting of halomethylated alkyl phenolic resins, methylol phenolformaldehyde resins, and mixtures thereof.

10. The composition of claim 1 wherein said phenolic resin is present in an amount between about 0.05 and 5 wt % of the total asphalt composition.

11. The composition of claim 1 wherein said poly(conjugated diene) is vinyl modified by a modifier selected from the group consisting of hexarnethylphosphoric acid triamide, N,N,N',N'-tetramethylethylene diamine, ethylene glyclol dimethyl ethyer, diethylene glycol dimethyl ether, triethylene gylcol dimethyl ether, tetraethylene glycol dimethyl ether, tetrahydrofuran, 1,4-diazabicyclo [2.2.2] octane, diethyl ethyer, triethylamine, tri-n-butylphosphine, p-dioxane, 1,2-dimethyoxy ethane, dimethyl ether, methyl ethyl ether, ethyl propyl ether, di-n-propyl ether, di-n-octyl ether, anisole, dibenzyl ether, diphenyl ether, dimethylethylamine, bis-oxalanyl propane, tri-n-propyl amine, trimethyl amine, triethyl amine, N,N-dimethyl aniline, N-ethylpiperidine, N-methyl-N-ethyl aniline, N-methylmorpholine, tetramethylenediamine, oligomeric oxolanyl propanes, 2,2-bis-(4-methyl dioxane), bistetrahydrofuryl propane, and mixtures thereof.

12. The composition of claim 1 comprising between about 85–99.9 wt % asphalt or bitumen, between about 1–15 wt % rubber, and between about 0.05–5 wt % phenolic resin.

13. The composition of claim 1 wherein the softening point of said asphalt composition is between about 40 and 100° C.

14. A method for producing an asphalt composition comprising mixing at an elevated temperature:
   a. a rubber comprising at least high vinyl poly(conjugated diene) having a vinyl content greater than about 35%,
   b. asphalt, and
   c. at least one phenolic resin.

15. The method of claim 14 wherein said poly(conjugated diene) comprises monomer units chosen from the group consisting of 1,3-butadiene, isoprene, 2,3-dimethyl-1,3-butadiene, 1,3-pentadiene, and mixtures thereof.

16. The method of claim 14 wherein said rubber further comprises vinyl-substituted aromatic hydrocarbon contributed monomer units.

17. The method of claim 16 wherein said vinyl-substituted aromatic hydrocarbon contributed monomer units are selected from any one or combination of styrene, α-methylstyrene, 1-vinylnaphthalene, 2-vinylnaphthalene, 1-α-methyl vinylnaphthalene, 2-α-methyl vinylnaphthalene, as well as alkyl, cycloalkyl, aryl, alkaryl, and aralkyl derivatives thereof, and di-or tri-vinyl substituted aromatic hydrocarbons.

18. The method of claim 14 wherein said phenolic resin comprises the reaction product of a phenol and an aldehyde.

19. The method of claim 14 wherein said phenolic resin is chosen from the group consisting of halomethylated alkyl phenolic resins, methylol phenolformaldehyde resins, and mixtures thereof.

20. The method of claim 14 wherein the softening point of said asphalt composition is between about 40 and 100° C.

* * * * *